United States Patent [19]

Schimpf et al.

[11] 3,852,495

[45] Dec. 3, 1974

[54] PREPARATION OF A LOW ALCOHOL DIETARY BEER

[75] Inventors: Franz-Wilhelm Schimpf, Hamburg; Wilfried Rinke, Halstenbeck, Holstein, both of Germany

[73] Assignee: Aktiengesellschaft fur Brauerei-Industrie, Basel, Switzerland

[22] Filed: Aug. 17, 1973

[21] Appl. No.: 389,170

Related U.S. Application Data

[63] Continuation of Ser. No. 105,058, Jan. 8, 1971, abandoned.

[30] Foreign Application Priority Data

Oct. 7, 1970 Switzerland.................... 15011/70

[52] U.S. Cl...................... 426/14, 426/11, 426/13, 426/64
[51] Int. Cl............................................ C12c 11/00
[58] Field of Search............. 426/11, 13, 14, 16, 64

[56] References Cited
UNITED STATES PATENTS

| 613,915 | 11/1898 | Uhlmann | 426/13 |
| 721,383 | 2/1903 | Nilson | 426/13 |
| 1,455,397 | 5/1923 | Heuser | 426/14 |
| 2,783,147 | 2/1957 | Pauls et al. | 426/13 |
| 3,484,244 | 12/1969 | Kozulis et al. | 426/16 |

FOREIGN PATENTS OR APPLICATIONS 274,225    7/1927    Great Britain

*Primary Examiner*—David M. Naff
*Attorney, Agent, or Firm*—Fleit & Jacobson

[57] ABSTRACT

Beer having a low carbohydrate and a low alcohol content is prepared by a process involving the steps of partly fermenting a mixture containing wort, hops and yeast in a first main fermentation to an apparent degree of fermentation of 40 to 85 percent, reducing the alcohol content to about 1 percent by boiling, filtering, adding fresh yeast, carrying out a second main fermentation, adding a solution of diastase having a high content of marginal dextrinase which acts on alpha-1, 6 marginal dextrin after the second fermentation has begun and after completing the second fermentation clarifying to a produce a dietetic beer.

12 Claims, No Drawings

PREPARATION OF A LOW ALCOHOL DIETARY BEER

This is a continuation of application Ser. No. 105,058, filed Jan. 8, 1971, now abandoned.

The marginal dextrinases recovered from malt may be used to convert the normally unfermentable alpha-1,6-marginal dextrins of malt wort into fermentable sugars. This fact has been utilized in the production of highly fermented beers. For this reason, processes are known in which enzyme-containing malt extracts are added to the fermenting wort so that a beer is obtained which is substantially free of sugar. These processes have the disadvantage that a time of several months up to half a year is often required until the desired degree of fermentation is reached. In some cases it is not possible at all completely to ferment the last amounts of the sugars, which load the diabetic.

The slow decomposition of the dextrins in the previously known processes is due above all to the low content of marginal dextrinases in the malt extract. Because the marginal dextrinases are sensitive to temperature, they are inactivated to a large extent as the malt is kiln-dried. An additional part is inactivated by the relatively high temperatures prevailing in the mash which is prepared to recover the enzyme extract. The remaining marginal dextrinases act on the alpha-1,6-marginal dextrins at temperatures which are far lower than the optimum temperatures for these enzymes.

The alcohol content of the highly fermented beers has proved an additional obstacle to the efforts for a decomposition of the marginal dextrins. It has been found that the enzymatic hydrolysis is inhibited by the high content of ethyl alcohol, mainly in the last stage of the fermentation. The fermentation may also be inhibited by amyl alcohol, which is contained in highly fermented beers in much larger amounts than in normal beers and has a toxicity that is nine times higher than that of ethyl alcohol.

The high alcohol content of the special beers intended for diabetics is undesired for another reason too. Diabetics have an excessive weight, as a rule, and their liver is more sensitive than that of a healthy person. For this reason, many physicists believe that a beer intended for diabetics should not have a higher alcohol content than a normal beer. Because the highly fermented beers are not full-bodied, they cannot be diluted with beers having a lower alcohol content in order to reduce the alcohol content.

The recognitions which have been described are taken into account in the present process, in which the marginal dextrinases are first activated in that the fermentation is carried out at extreme temperatures. Because this step involves undesired changes of taste, particularly when the fermentation is carried out in open vessels, and because the high temperatures are required only for a decomposition of the marginal dextrins, it has proved desirable for the purpose of the invention to carry out the fermentation process in two steps.

The invention relates to a process of producing a dietary beer, which has low alcohol content and carbohydrate contents and a low calorific value, which process comprises a main fermentation carried out at different temperatures, an addition of diastase solution, a removal of spent yeast, an addition of fresh yeast and a stripping of alcohol, and this process is characterized in that the wort is fermented in a first main fermentation step only to an apparent degree of fermentation of 40–85 percent, whereafter the new beer (partly fermented wort) is boiled to reduce the alcohol content to about 1 percent, fresh yeast is added for a second main fermentation step, partly new beer is clarified when the fermentation in the second main fermentation step has been initiated, the second main fermentation step is completed after a diastase solution enriched with marginal dextrinases has been added, and the beer is stored for an afterfermentation and is finally clarified.

The dietary beer according to the invention is suitably made from a light-coloured malt, which is mashed in the usual manner at the temperature which is optimum for the formation of maltose. The wort is boiled with hops and then strained and cooled. In a first main fermentation step, the cooled wort is fermented at a temperature of 4°–8° C. to an apparent degree of fermentation corresponding to 40–70 percent of the extract. This generally requires 2–5 days. The fermentation is then interrupted. The partly fermented wort is pumped into the brew kettle and boiled for 40–50 minutes, preferably 45 minutes, whereby about 1.5 percent of the about 2.5 percent ethyl alcohol which are present are stripped so that the finished beer has in spite of its high fermentation only an ethyl alcohol content which is about the same as that of a normal beer. At the same time, approximately all of the higher aliphatic alcohols (fusel oils) contained in the beer are stripped so that the final fermented beer has only about 50 percent of the normal content of these substances and for this reason is much more wholesome. The boiling of the beer in accordance with the invention affords further advantages because the sulfur-containing substances as well as the diacetyl and acetoin are stripped almost completely whereas they are normally removed only during the storage and maturing. Besides, the formation of esters is promoted. As a result, the time for which the beer is stored to effect a physical or biochemical removal of these substances and to induce a formation of esters can be very substantially reduced. The partly fermented wort is usually boiled under atmospheric pressure and in this case is boiled for about 45 minutes. Alternatively, the alcohols may be stripped under a superatmospheric or subatmoshperic pressure; in this case, the boiling time will be correspondingly reduced or prolonged and the beneficial effects of the interstage boiling according to the invention will be obtained too. When the boiling has been terminated, the partly fermented beer is cooled and is filtered from the precipitates which have formed.

The subsequent second main fermentation step is carried out at a temperature of 12°–15° and after an addition of fresh yeast. The fermentation is initiated quickly by the maltose which is still present in the new beer (partly fermented wort). After about 12 hours, the beer is pumped from the sediment which has separated and a diastase solution which has a particularly high content of marginal dextrinases and consists of a malt extract made in a special manner is added in an amount of 3–7 percent. The new beer is then stored at 12°–20° C. for additional 7–10 days to complete the fermentation.

To produce the diastase solution which in accordance with the invention has an increased content of marginal dextrinases, grits of light-coloured malt are mixed with water at 45° C. and the resulting mash is stirred for 30 minutes. The operation in this temperature range results in the formation of an optimum amount of marginal dextrinases whereas the danger of a bacterial infection is eliminated to a large extent. After mashing for 30 minutes, the stirrer is stopped and the mash is allowed to stand for about 30 minutes for clarification. The supernatant and clarified malt extract is added to the new beer in the second fermentation step.

When the second main fermentation step has been terminated, the beer is cooled and is pumped into a storage tank, where the yeast is separated and in which the beer is stored for about one week to two weeks for a precipitation of the substances which cause turbidity. Hence, the total production time of the dietary beer according to the invention is about 4–5 weeks.

The described process according to the invention affords the further advantage that the boiling of the hops is carried out in two steps. One-half of the hops is added to the original wort and is boiled in the wort having a pH-content of about 5.5. The other half is added to the new beer and is boiled during the removal of alcohol from the new beer when the same has a pH-value of about 4.7. It is known that the fineness of the hop bitters increases as the pH-value of the liquor in which they are boiled decreases and the beers obtained from hopped wort boiled at this pH-value have a substantially improved stability of taste, In a normal production process it is not possible to boil a wort having such pH-value.

In a particularly desirable embodiment of the invention, the wort is fermented in the first fermentation step to an apparent degree of fermentation of 75–85 percent, preferably 80 percent. When alcohol has been removed, dietary wort is added to the new beer in an amount of 50–150 percent, preferably 100 percent, related to the new beer, whereafter the entire mixture is subjected to final fermentation.

In carrying out the process it is not necessary to use an original wort having a normal extract content of 11–14 percent. It is possible to use worts having a higher extract content, such as are employed in the production of strong beers and contain 16–20 percent extract and have been made from malt that has been kiln-dried at low or high temperatures.

The German patent specification No. 634,603 describes the production of a dietary beer in a process in which the main fermentation is carried out in two steps at different temperatures. In that process the strain of yeast used in the second step differs from that used in the first step and is suitable for a fermentation also of dextrins. In the process according to the invention, the same strain of yeast is used for the fermentation in both steps and the yeast which has been used in the first step and has been more or less autolyzed by the boiling to remove alcohol is replaced by fresh yeast.

From the German patent specification No. 647,851 it is also known to add new diastase solution to the beer in any stage of its fermentation. That patent specification does not teach to carry out the fermentation at different temperatures in the first and second steps, and to terminate the first step when a certain content of extract maltose is still present so that the fermentation in the second step is initiated more rapidly. According to the invention, a diastase solution having a particularly high content of marginal dextrinases is added to the partly fermented yeast.

It is also known to produce beer concentrates by evaporating the completely fermented beer (Printed German Application No. 1,442,237 of Dec. 12, 1968). Contrary to that process, the invention teaches to interrupt the main fermentation and to reduce the alcohol content of the new beer (partly fermented wort).

The invention will now be explained more fully with reference to the examples.

EXAMPLE 1

A. A pale malt is mashed at a temperature of 62°–65° C., which is optimum for the formation for maltose. When the mash has been strained, the wort is boiled for 45 minutes together with 50 percent of the total amount of hops to be added. The wort which is withdrawn contains 11.5 percent extract and is then cooled.

B. In the fermenting vessel, 0.5 liter yeast per hectoliter of the cooled wort is added to the latter at 5° C., whereafter the wort is fermented at temperatures up to 8° C. until an apparent degree of fermentation of about 55 percent has been reached after about 3–4 days. This degree of fermentation corresponds to an apparent residual extract content of about 5.1 percent. A calculation shows that about 5.2 percent real extract have been fermented so that the new beer (partly fermented wort) IA contains about 2.5 percent alcohol. The new beer IA is pumped into the brew kettle and boiled in the open kettle for 45 minutes after the remaining 50 percent of the total amount of hops have been been added. This boiling reduces the alcohol content to about 1.0 percent. The evaporated liquid is then replaced by water, whereafter the partly fermented wort is cooled.

C. After the removal of alcohol, the new beer IA is filtered and 1 liter of yeast per hectoliter of this beer is added thereto. When the fermentation has been initiated after about 12 hours, the new beer is decanted from the sediment and about 6 percent malt extract prepared as described hereinbefore to have a high content of marginal dextrinases is added to the decanted new beer. The fermentation is continued at temperatures in the range of 12°–20° C. and is terminated after 7 days. The apparent residual extract amounts to about 0.3 percent.

D. The fermented beer IB is cooled, pumped from the yeast and stored for twelve days. When the substances causing turbidity have been separated, the beer is mature for consumption.

EXAMPLE 2

A. As described in Section A. of Example 1, a wort is produced which has an extract content of 11.5 percent and a pH-value of 5.4.

B. 0.5 liter of yeast per hectoliter of the cooled wort is added to the latter at 5° C., whereafter the wort is fermented at temperatures up to 8° C. The first fermentation step is terminated when an apparent degree of fermentation of 80 percent has been reached after seven to eight days. The new beer (partly fermented wort) IIA contains about 3.8 percent alcohol and is pumped into the brew kettle, where additional 50 percent of the total amount of hops are added to the new beer, which is then boiled at a pH-value of 4.5 for 45 minutes to volatilize part of the alcohol. The evaporated liquid is replaced by water. The wort is then cooled.

C. After the removal of part of the alcohol, the partly fermented, new beer IIA which has been obtained in the first fermenting step has an equal volume of a dietary wort added thereto. This wort contains 11.5 percent extract and has been prepared in accordance with Section A of Example 2. The wort containing all hops to be added is boiled for 90 minutes.

Yeast is added to the mixture of a new beer and new wort in an amount of 1 liter per hectoliter and at a temperature of 12° C. and the resulting mixture is allowed to stand for 12 hours. The liquor is then pumped from the sediment and 5 percent malt extract having an increased content of marginal dextrinases are added. The fermentation temperature is maintained between 12° C. and 20° C. for 9 days. Thereafter the fermentation is terminated. The fermented beer IIB contains 3.6 percent alcohol and has an apparent extract content of about 0.3 percent.

D. When the beer has been cooled, it is separated from the yeast and stored for 13 days in the usual manner. The resulting substances which cause turbidity are removed by filtration. The dietary beer is then ready to be bottled.

What is claimed is:

1. A process for producing a dietary beer having a low-alcohol content, a low-carbohydrate content and a low-calorie value comprising:
   a. allowing a mixture containing wort, hops and yeast to partially ferment in a first fermentation step at a temperature of about 4° to 8°C for 2 to 5 days to an apparent degree of fermentation of about 40 to 85 percent;
   b. reducing the content of alcohol in the partially fermented mixture to about 1 percent by boiling;
   c. filtering the partially fermented mixture;
   d. adding fresh yeast to the partially fermented mixture;
   e. allowing the partially fermented mixture to continue to ferment in a second fermentation step at a temperature of about 12° to 20°C for 7 to 10 days;
   f. clarifying the partially fermented mixture after the second fermentation step has begun;
   g. adding about 5 volume percent of a solution of diastase having a high content of marginal dextrinase which acts on alpha-1,6 marginal dextrin to the partially fermented clarified mixture;
   h. allowing the clarified mixture to age; and
   i. clarifying the fermented mixture.

2. A process according to claim 1 in which the first fermentation step is carried out until the mixture of wort, hops and yeast has undergone an apparent degree of fermentation of about 80 percent.

3. A process according to claim 1 wherein wort is added to the partially fermented mixture in an amount of about 100 percent by volume of the wort present in said mixture.

4. A process for producing a low-calorie, low-alcohol content, low carbohydrate dietetic beer comprising:
   a. partially fermenting a mixture containing wort, hops and yeast at a temperature between about 5° and 8°C for about 2 to 5 days to an apparent degree of fermentation of about 40 to 85 percent in a first fermentation step;
   b. boiling the partially fermented mixture until its alcohol content is reduced to about 1 percent by weight;
   c. filtering the partially fermented mixture;
   d. adding fresh yeast to the filtered partially fermented mixture;
   e. allowing the partially fermented mixture to undergo additional fermentation at a temperature of about 12° to 20°C for 7 to 10 days in a second fermentation step;
   f. adding about 5 volume percent of a solution of diastase having a high content of marginal dextrinase which acts on alpha-1,6 marginal dextrin after the second fermentation step has begun;
   g. allowing the partially fermented mixture to continue to ferment in a second fermentation step; and
   h. clarifying the fermented mixture to produce a dietetic beer.

5. A process according to claim 4 wherein said solution of diastase is produced by mixing water with grits of malt at a temperature of about 45°C and thereafter allowing the grits of malt mixture to stand until a supernatant is formed having said high content of marginal dextrinase which acts on alpha-1,6 marginal dextrin.

6. A process according to claim 5 wherein said grits of malt are continuously mixed with water for about thirty minutes and thereafter the grits of malt mixture is allowed to stand for an additional 30 minutes before the grits of malt mixture is added to said partially fermented mixture.

7. A process according to claim 1 wherein said partially fermented mixture is boiled under atmospheric pressure for about 45 minutes.

8. A process according to claim 1 wherein said partially fermented mixture is boiled at superatmospheric pressure.

9. The process according to claim 1 wherein said partially fermented mixture is boiled at subatmospheric pressure.

10. A process according to claim 1 wherein one-half of said hops are added to said mixture before said first fermentation step and the other half at the end of said first fermentation step and before said partially fermented mixture is boiled.

11. A process according to claim 1 wherein one-half of said hops are added to said mixture before said first fermentation step and the other half at the end of said first fermentation step and before said partially fermented mixture is boiled, wherein said mixture is fermented to an apparent degree of fermentation of about 75 to 85 percent, wherein a second mixture which is the same as said mixture fermented in said first fermentation step is added to said partially fermented mixture after said mixture is filtered and the combined mixture is boiled for about 90 minutes, and wherein said partially fermented mixture is allowed to continue to ferment in said second fermentation step for about 9 days.

12. A process according to claim 1 in which said mixture contains as much extract as a wort used for producing strong beer.

* * * * *